Dec. 5, 1944. G. RISCHE 2,364,553
SIDE ROLLING MECHANISM FOR AUTOMOBILES
Filed Sept. 25, 1942 2 Sheets-Sheet 1
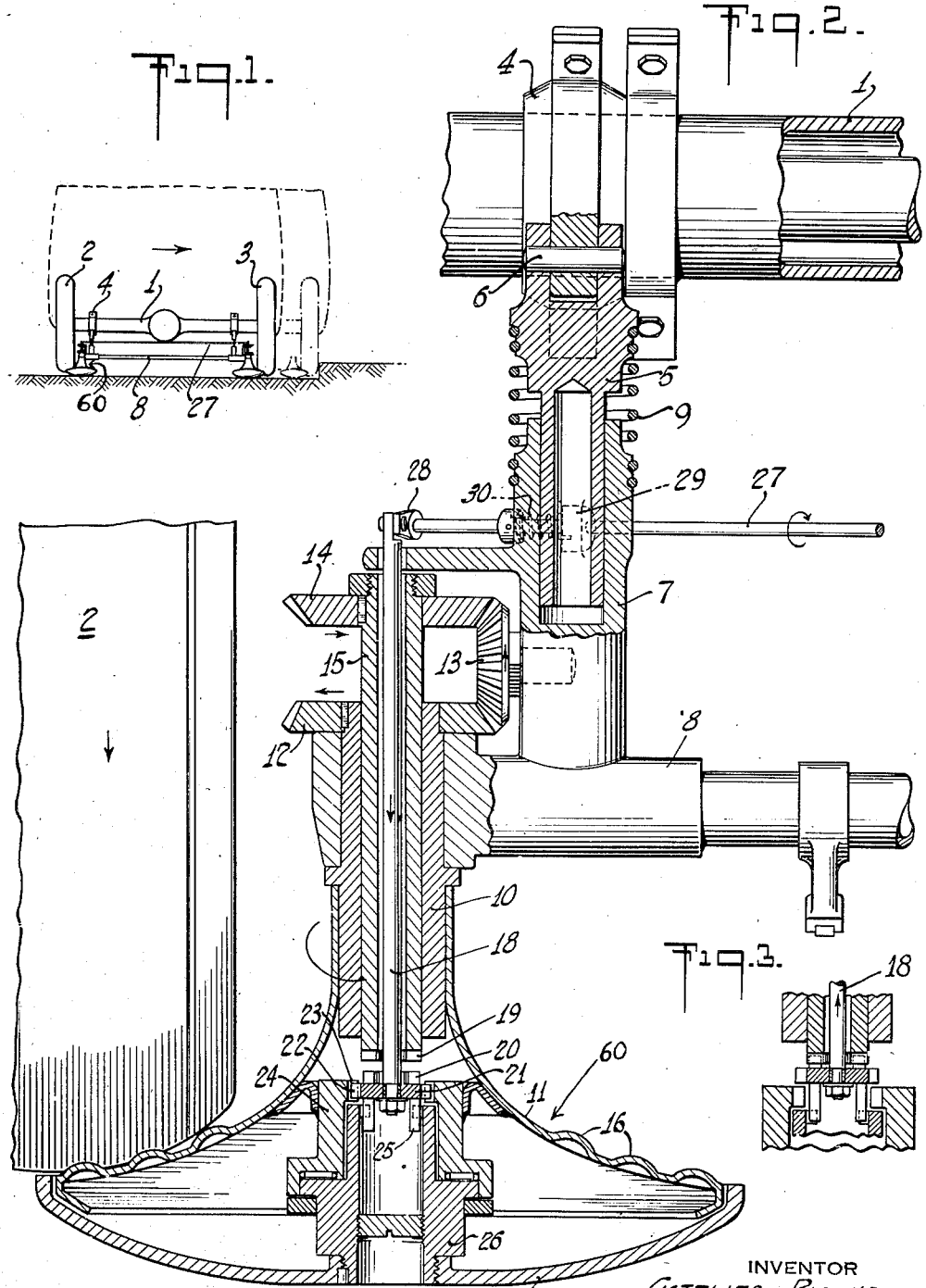
INVENTOR
GOTTLIEB RISCHE.
BY K. A. Mayr
ATTORNEY

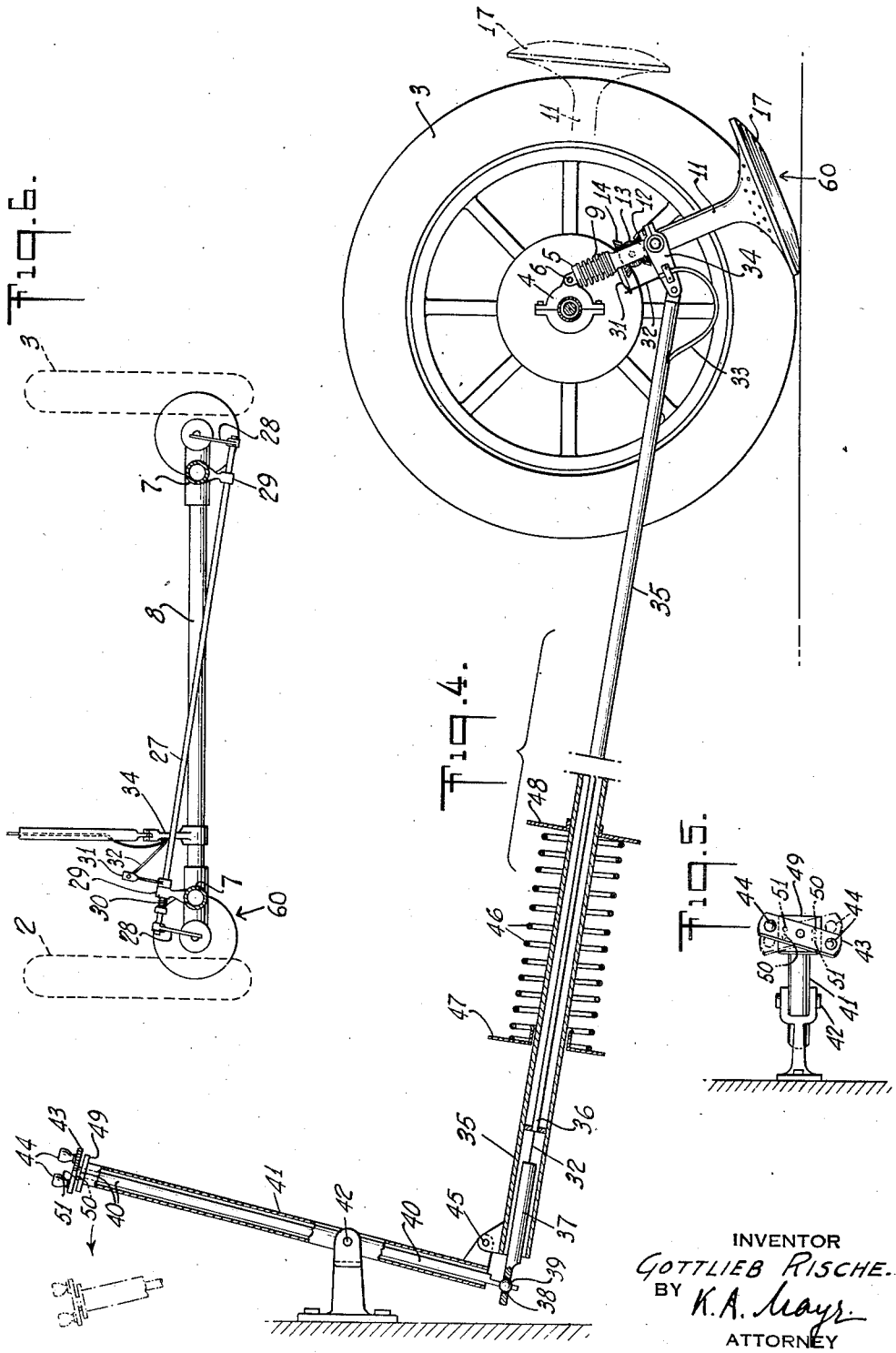

Patented Dec. 5, 1944

2,364,553

UNITED STATES PATENT OFFICE 2,364,553

SIDE ROLLING MECHANISM FOR AUTOMOBILES

Gottlieb Rische, New York, N. Y.

Application September 25, 1942, Serial No. 459,641

17 Claims. (Cl. 180—1)

The present invention relates to a device for facilitating parking of automobiles, particularly to a device for moving the driven wheels of an automobile sideways substantially in the direction of their axes of rotation.

The present application is a continuation in part of my copending application Ser. No. 389,711, filed April 22, 1941, and now abandoned.

It is an object of this invention to provide means whereby a car may be shifted laterally to either side, under its own power, as in parking, without movement backward or forward.

A further feature is in the provision of means, readily applied to presently existing cars, by which side movement is easily accomplished, safely and surely, without the usual difficulty and also without the exercise of physical energy.

Another purpose of the invention is to produce means, put into operation by moving a hand lever or pedal mounted for convenient access, by which a car can be moved to the right or left, without backing or going forward any material distance.

These objects, of paramount advantage to car drivers, are accomplished by the novel construction, combination and arrangement of devices, as hereinafter described and illustrated in the accompanying drawings, constituting a material component of this disclosure, and in which:

Figure 1 is a diagrammatic rear view of an automobile equipped with the device according to the present invention.

Fig. 2 is a part sectional view of one side of a device according to the present invention.

Fig. 3 is a sectional view of a portion of the other side of the device according to the present invention.

Fig. 4 is a diagrammatic longitudinal side view of the mechanism according to the present invention.

Fig. 5 is a top view of the operating lever for the device according to the present invention.

Fig. 6 is a diagrammatic top view of the device according to the present invention.

Like parts are designated by like numerals in all figures of the drawings.

Referring particularly to the drawings, numeral 1 designates the housing of the driven axle of an automobile. 2 designates the left rear wheel and 3 the right rear wheel. 4 designates a support for clamping the device 60 according to the invention to the rear axle housing. To support 4 a piston member 5 is connected which is swingable about fulcrum 6. The piston member 5 extends into a cylindrical cavity in column 7 which latter is rigidly connected with the transverse structural member 8. A coil spring 9 resiliently holds members 5 and 7 at a desired distance. The ends of transverse rod 8 of which only the left end is shown, each revolvably hold a hollow shaft member 10 to which a substantially mushroom shaped driving disc member 11 is rigidly connected. The upper end of shaft member 10 holds a bevel gear wheel 12 which cooperates with bevel gear wheel 13 which latter is rotatably mounted to column 7 and cooperates with a third bevel gear wheel 14. Wheel 14 is rigidly connected with a hollow shaft member 15 which is rotatably disposed in shaft member 10. Member 11 is provided with protuberances 16 for improving frictional engagement thereof with the tire of wheel 2.

Fig. 4 shows the side rolling device 60 according to the present invention which is mounted to the right side of the axle housing 1 and to the right end of transverse rod 8 in operating position. This device is like the one shown in Fig. 2. If the rear wheels are driven in reverse they try to roll up on member 11 thereby revolving said member about its longitudinal axis and about shaft 15. Because of bevel gears 12, 13, 14 shaft 15 rotates in opposite direction to shaft member 10. Since shaft member 10 is connected with member 11 which has the shape of an inverted mushroom, convex shaped driven member 17, if connected with shaft 15, will be rotated in a direction opposite to that of member 11. Such connection is effected by a coupling arrangement at and adjacent to the lower end of shift rod 18 and in the position shown in Fig. 3.

The lower end of shaft 15 is provided with axially projecting teeth 19 which are adapted to engage the recesses between the teeth 20 projecting axially upward from coupling member 21.

As both side rolling devices according to my invention are arranged on the inside of wheels 2 and 3 and both convex members 17 must rotate in the same direction, it is necessary that when member 21 of one side engages the shaft 15 of the same side, member 21 of the other side is disengaged from shaft 15 of said other side, i. e. is in the position shown in Fig. 2. In this position coupling teeth 22 extending radially outward from coupling member 21 engage coupling teeth 23 extending radially inward from member 24 which is rigidly connected with member 11. Coupling member 21 has downward extensions 25 which are axially slidably connected at all times with a socket member 26 which is rigidly connected with convex member 17. The latter is rotated directly by and in the same direction as driving member 11 if the coupling mechanism is in the position shown in Fig. 2.

The shift rods 18 are operated in the following manner: A transverse shift rod 27 which is revolvably supported in arms 29 extending from columns 7, has at each of its ends rigidly connected thereto levers 28. These levers are individually fulcrumed to the upper ends of rods 18. A torsion spring 30 has one end connected with one arm 29 and the other end rigidly connected with transverse shift rod 27 and tends to hold said rod and thereby vertical shift rods 18 and coupling members 21 in one extreme shift position. Since levers 28 extend in opposite directions from rod 27 one member 21 is pressed down to engage part 24 and the other member 21 is forced upward to engage shaft 15, and vice versa when rod 27 is revolved against the tension of spring 30 into the other extreme shift position.

For rotating rod 27 a lever 31 is rigidly connected therewith to the outer end of which lever one end of a Bowden wire 32 is connected. One end of the tubular part 33 of the Bowden cable is rigidly connected with a relatively stationary part, in the embodiment of the invention shown, with an arm 34 which is rigidly connected with the transverse structural member 8. After forming a loop to provide for necessary slack, the Bowden cable disappears inside tubular connecting member 35. The other end of the hose portion of the Bowden cable is fixed to the inside of member 35 at 36. The end of wire 32 projecting from point 36 is rigidly connected with the rear end of a cylindrical member 37 which has an opening 38 at its forward end accommodating a ball 39 which is eccentrically connected with rod 40. The latter is revolvably displaced inside a tubular two-arm lever 41 swinging about a fulcrum 42. To the upper end of rod 40 a transverse member 43 is rigidly connected which carries at its end handle knobs 44. Lever 41 is located near the seat of the driver of the automobile and the knobs 44 are in convenient reach of one of his hands. Upon pulling one of the knobs in a direction towards the driver and substantially at a right angle to lever 41, rod 40 and eccentric 39 are revolved and piston member 37 is axially moved relatively to member 35. Thereby the wire 32 and the lever 31 are pulled and rod 27 is rotated against the action of spring 30 and shift rods 18 and coupling members 21 are moved into one extreme operating position.

By pulling one of the knobs 44 the operating lever is also pulled from rest position, which is shown in dotted lines in Fig. 4 into operating position which is shown in solid lines. The clockwise movement of lever 41 about fulcrum 42 causes a forward motion of rod 35 which is hinged to lever 41 by means of hinge means 45. This movement is against the tension of spring 46 one end of which abuts a stationary part 47 and the other end a flange 48 which is rigidly connected with tubular rod 35.

To make the drawing clearer the left portion of Fig. 4 is made in larger scale than the right portion.

Forward movement of rod 35 causes arm 34, transverse structural member 8 and the side rolling devices according to the invention to be pulled down from idle position which is shown in dotted lines on the right end of Fig. 4 into operating position which is shown in solid lines.

When the side rolling devices are not used, i. e. in all conditions of the automobile except when parking, they are pushed back and held up by the action of spring 46. During upward swinging of the side rolling devices they are removed from wheels 2 and 3 by the action of spring 9 and also because of the eccentric connection, at 6, of the side rolling devices with respect to the rear axle. In idle position the upper portion of lever 41 is well forward and out of the way of the driver. Two-arm lever 43 is slanted with respect to the longitudinal axis of the car and the coupling members 21 are in one extreme operating position, i. e. set either for rolling the car to the right or to the left.

It is preferred that the mechanism is always initially set in such manner that by pulling the right knob 44 in a direction substantially at right angle with respect to lever 41 the mechanism is adjusted for rolling the car to the right and by pulling the left knob the car moves to the left. Pulling of one of the knobs 44 in a direction substantially parallel to the longitudinal center line of the car also moves lever 41 and the side rolling devices from their idle position into operating position. If the rear wheels are rotated by the automobile engine in reverse they roll up on discs 11 thereby providing the power for the side rolling operation and holding the whole mechanism in the desired operating position, so that rod 41 need not be further manipulated.

Underneath lever 43 a plate 49 is arranged which is rigidly connected with lever 41 and which has recesses 50 into which snap buttons 51 are resiliently forced whenever lever 43 is in an extreme operating position. Thereby the mechanism is held in position for rolling the car to the left or to the right. Spring 30 is not made superfluous by this arrangement, said spring being necessary that pull is exerted on wire 32 at all times and also for preventing an intermediary position of the shifting mechanism which would be harmful to the coupling member 21 and parts engaged thereby.

If the car engine is stopped and the clutch disengaged and the car shift gear set in neutral the car rolls a little forward thereby releasing members 11 which then snap up into idle position because of the action of spring 46.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A side rolling mechanism for automobiles having an engine driven running wheel, said mechanism comprising an inverted mushroom like device disposed substantially adjacent to said running wheel and connected with said automobile swingably about an axis substantially parallel to the axis of rotation of said running wheel and adapted to be swung into an operative and into a rest position, said device comprising a driving member rotatable about an axis disposed substantially at right angles to the swing axis of said device and having an outer portion frictionally engaging said running wheel when said device is in operative position, and a driven member disposed coaxially with said driving member and rotatable about the same axis and comprising a substantially convex shaped portion disposed adjacent to and outside of said outer portion of said driving member and engaging the ground when said device is in operative position, and a driving mechanism interconnecting said driving and said driven member, said device, when in operative position, supporting said running wheel and said driving member being rotated by said running wheel under power of the automobile engine and rotating, through said driving mechanism, said driven member and the latter rolling the running wheel sideways, said device, when in rest position, being spaced from said running wheel and from the ground.

2. A side rolling mechanism for automobiles having an engine driven axle and a running wheel connected thereto and a housing for said axle, said mechanism comprising an inverted mushroom like device disposed substantially adjacent to said running wheel and connected with said housing swingably about an axis substantially parallel to said axle and adapted to be swung into an operative and into a rest position, said device comprising a driving member rotatable about an axis disposed substantially at right angles to the swing axis of said device and having an outer portion frictionally engaging said running wheel when said device is in operative position, and a driven member disposed coaxially with said driving member and rotatable about the same axis and comprising a substantially convex shaped portion disposed adjacent to and outside of said outer portion of said driving member and engaging the ground when said device is in operative position, and a driving mechanism interconnecting said driving and said driven member, said device, when in operative position, supporting said running wheel and said driving member being rotated by said running wheel under power of the automobile engine and rotating, through said driving mechanism, said driven member and the latter rolling the running wheel sideways, said device, when in rest position, being spaced from said running wheel and from the ground.

3. A mechanism as set forth in claim 2, said device being swingably connected with said housing and eccentrically with respect to said axle.

4. A side rolling device for automobiles having two engine driven running wheels, said mechanism comprising two devices swingably connected with said automobile adjacent to the axes of rotation of said running wheels and individually disposed substantially adjacent to the inside of said running wheels, each of said devices comprising a hollow trunk member having a flared end portion and being rotatable about an axis disposed substantially at a right angle to the axes of rotation of said running wheels and a substantially convex shaped member disposed outside of and adjacent to said end portion and being coaxially and rotatably connected with said trunk member, the peripheral portions of said end portions individually frictionally engaging said running wheels, and the peripheral portions of said convex shaped members individually frictionally engaging the ground when said devices are swung into operating position and being individually rotated by said running wheels under power of the automobile engine and rolling the automobile sideways, and being spaced from said running wheels and from the ground when said devices are swung into idle position.

5. A mechanism as set forth in claim 4, said devices individually comprising a reversing gear, and adjustable rotatable connecting means adapted to connect said trunk member and said convex shaped member either directly or through said reversing gear.

6. A mechanism as set forth in claim 4, said devices individually comprising a reversing gear, adjustable rotatable connecting means adapted to connect said trunk member and said convex shaped member either directly or through said reversing gear, and shifting means connected to and operatively interconnecting the adjustable connecting means of both said devices and holding one of said connecting means in position for directly connecting said trunk member and said convex shaped member and simultaneously holding the other of said connecting means in position for connecting said trunk member and said convex shaped member through said reversing gear.

7. A mechanism as set forth in claim 4, said devices individually comprising a reversing bevel gear having a bevel gear wheel rigidly and coaxially connected with said trunk member, a shaft member rotatably disposed inside said trunk member and having an end projecting therefrom at the end other than said flared end portion and having at the projecting end another bevel gear wheel coaxially connected therewith, a third bevel gear wheel engaging both said first and said other gear wheel, and adjustable rotatable connecting means disposed coaxially with and inside said trunk member and being axially slidably connected with said convex shaped member and being adapted to be connected either with said trunk member or with said shaft member.

8. A mechanism as set forth in claim 4, said devices individually comprising a reversing bevel gear having a bevel gear wheel rigidly and coaxially connected with said trunk member, a hollow shaft member rotatably disposed in and having an end projecting inside said trunk member and having an end projecting therefrom at the end other than said flared end portion and having at the projecting end another bevel gear wheel coaxially connected therewith, a third bevel gear wheel engaging both said first and said other gear wheel, a shift rod axially slidably disposed within said shaft member and having an end portion projecting from said hollow shaft member inside said trunk member, a coupling member rotatably connected with said end portion of said shift member and being axially slidably connected with said convex shaped member and adapted to be either connected with said trunk member or with the end of said shaft member inside said trunk member.

9. A side rolling mechanism for automobiles having two engine driven running wheels, said mechanism comprising structural means including a transverse member and two arm means extending substantially at right angles therefrom and being swingably connected with the automobile substantially adjacent to the axis of rotation of said running wheels, two hollow trunk members disposed substantially adjacent to and inside of said running wheels and individually rotatably connected with the ends of said transverse member and having axes of rotation substantially parallel to said arm means and individually having flared end portions, two substantially convex shaped members individually disposed coaxially with, outside of, adjacent to, and individually rotatably connected with said trunk members, the peripheral portions of said flared end portions individually frictionally engaging said running wheels and the peripheral portions of said convex shaped members individually engaging the ground and being individually rotated by said running wheels under power of the automobile engine and rolling the automobile sideways when said structural means are swung toward the ground.

10. A mechanism as set forth in claim 9, in which said arm means comprise a column member rigidly connected with said transverse member and a hinge member swingably connected with the automobile and longitudinally slidably connected with said column member and resilient means connected to and resiliently spacing said column member from said hinge member.

11. A mechanism as set forth in claim 9 comprising a hand lever disposed in reach of the automobile driver and fulcrumed to the automobile, a connecting member movably connected with said transverse member and with one end of said hand lever, and resilient means connected with said connecting member and with the automobile and resiliently forcing said hand lever and said structural means and parts connected thereto into non-operating position.

12. A mechanism as set forth in claim 9 and comprising resilient means connected with the automobile and with said structural means and resiliently forcing said structural means into a position where said arms are substantially parallel to the ground and said trunk members and parts connected thereto are in inoperative position.

13. A mechanism as set forth in claim 4, said devices individually comprising a reversing gear, adjustable rotatable connecting means adapted to connect said trunk member and said convex shaped member either directly or through said reversing gear, shifting means connected to and operatively interconnecting the adjustable connecting means of both said devices and holding one of said connecting means in position for directly connecting said trunk member and said convex shaped member and simultaneously holding the other of said connecting means in position for connecting said trunk member and said convex shaped member through said reversing gear, an operating lever fulcrumed to the automobile and disposed in reach of the driver, connecting means connecting said lever and said devices, resilient means connected with the automobile and with said connecting means and resiliently holding said lever and said devices in non-operating position, shifting means operating means disposed parallel to and rotatably connected with said lever and comprising handle means disposed at the end of said lever next to the driver and constituting the manipulating means for said lever as well as for said operating means, and other connecting means connecting said operating means and said shifting means, whereby, upon manipulation of said handle means, said operating lever and parts connected thereto and said shifting means are operated simultaneously.

14. A side rolling mechanism for automobiles having two engine driven running wheels, said mechanism comprising support means connected with the automobile and swingable substantially about the axis of rotation of said running wheels, two mechanical units individually connected with the lateral ends of said support means and disposed individually substantially adjacent to the inside of said running wheels, each of said units comprising a hollow trunk member having a flared end portion and being rotatable about an axis substantially at a right angle to the axis of rotation of said running wheels, a substantially convex shaped member disposed outside of and adjacent to said end portion and coaxially rotatably connected with said trunk member, the peripheral portions of said end portions individually frictionally engaging said running wheels and the peripheral portions of said convex shaped members individually frictionally engaging the ground when said units are swung into operating position and being individually rotated by said running wheels under power of the automobile engine and rolling the automobile sideways and being spaced from said running wheels and from the ground when said units are swung into idle position, said units individually comprising a reversing gear, adjustable rotatable connecting means adapted to connect said trunk member and said convex shaped member either directly or through said reversing gear, shift means connected to and operatively interconnecting the adjustable connecting means of both said devices and holding one of said connecting means in position for directly connecting said trunk member and said convex shaped member and simultaneously holding the other of said connecting means in position for connecting said trunk member and said convex shaped member through said reversing gear, and resilient means connected with said shift means and with said support means and holding said shift means in one extreme operating position.

15. A mechanism as set forth in claim 14 comprising a tubular operating lever fulcrumed to the automobile and having one end disposed in easy reach of the driver, tubular connecting means connecting said lever and said support means, shift means operating means rotatably disposed in said lever and comprising handle means disposed at the end of said lever next to the driver and constituting the manipulating means for said lever as well as for said operating means, and other connecting means disposed substantially within said tubular connecting means and connecting said operating means and said shift means whereby upon manipulation of said handle means said operating lever and parts connected thereto are operated and said shift means are set simultaneously.

16. A mechanism as set forth in claim 4, said devices individually comprising a reversing gear, adjustable rotatable connecting means adapted to connect said trunk member and said convex shaped member either directly or through said reversing gear, shift means connected to and operatively connecting the adjustable connecting means of both said devices and holding one of said connecting means in position for directly connecting said trunk member and said convex shaped member and simultaneously holding the other of said connecting means in position for connecting said trunk member and said convex shaped member through said reversing gear, an operating lever fulcrumed to the automobile and disposed in reach of the driver, connecting means connecting said lever and said devices, shift means operating means disposed parallel to and rotatably connected with said lever and comprising two spaced handle means disposed at the end of said lever next to the driver and constituting the manipulating means for said lever as well as for said operating means, other connecting means connecting said operating means and said shift means, whereby, upon manipulation of said handle means, said operating lever and parts connected thereto and said shift means are operated simultaneously, said handle means constituting the prongs of a bifurcated element of which the operating means rotatably connected with said lever is the stem, said lever and operating means being swingable in a plane substantially parallel to the vertical longitudinal axis plane of the automobile, said handle means being positioned parallel to and one on each side of the plane in which said lever is swingable, said lever, connecting means and devices connected thereto being so arranged that when the end of the lever next to the driver is pulled toward the driver by pulling on any one of the two handle means, said devices are moved from rest into operating position, and said shift means, other connecting means, and shift means operating means being so arranged that when the right handle means is pulled toward the driver said adjustable connecting means are so set that said convex shaped members roll the driven end of the automobile to the right, and when the left handle is pulled the driven end of the automobile moves to the left.

17. A mechanism as set forth in claim 4, said devices individually comprising a reversing gear, adjustable rotatable connecting means adapted to connect said trunk member and said convex shaped member either directly or through said reversing gear, shift means connected to and operatively interconnecting the adjustable connecting means of both said devices and holding one of said connecting means in position for directly connecting said trunk member and said convex shaped member and simultaneously holding the other of said connecting means in position for connecting said trunk member and said convex shaped member through said reversing gear, an operating lever fulcrumed to the automobile and disposed in reach of the driver, connecting means connecting said lever and said devices, shift means operating means disposed parallel to and rotatably connected with said lever and comprising handle means disposed at the end of said lever next to the driver and constituting the manipulating means for said lever as well as for said operating means, and other connecting means connecting said operating means and said shift means, whereby, upon manipulation of said handle means, said operating lever and parts connected thereto and said shift means are operated simultaneously, and snap means connected with said shift means operating means and with said lever and alternately temporarily rigidly connecting said operating means and said lever and temporarily holding said operating means in either one or the other extreme operating position.

GOTTLIEB RISCHE.